(12) United States Patent
Pisarevsky

(10) Patent No.: US 10,729,275 B2
(45) Date of Patent: Aug. 4, 2020

(54) SYSTEM FOR PREPARING AND STORING A COLD BEVERAGE

(71) Applicant: Arie Pisarevsky, Montreal (CA)

(72) Inventor: Arie Pisarevsky, Montreal (CA)

(*) Notice: Subject to any disclaimer, the term of this patent is extended or adjusted under 35 U.S.C. 154(b) by 57 days.

(21) Appl. No.: 15/920,525

(22) Filed: Mar. 14, 2018

(65) Prior Publication Data

US 2018/0263404 A1 Sep. 20, 2018

Related U.S. Application Data

(60) Provisional application No. 62/611,032, filed on Dec. 28, 2017, provisional application No. 62/594,706, filed on Dec. 5, 2017, provisional application No. 62/533,162, filed on Jul. 17, 2017, provisional application No. 62/470,963, filed on Mar. 14, 2017.

(51) Int. Cl.
*A47J 31/06* (2006.01)
*A23F 5/26* (2006.01)
*A47J 31/00* (2006.01)

(52) U.S. Cl.
CPC ........... *A47J 31/0615* (2013.01); *A23F 5/262* (2013.01); *A47J 31/005* (2013.01)

(58) Field of Classification Search
CPC .. A47J 31/0615; A47J 31/0605; A47J 31/005; A47J 31/061; A47J 31/0626; A47J 31/18; A47J 31/0636; A47J 31/10; A47J 31/467; A47J 31/446
USPC .................................. 99/289, 298, 300, 306
See application file for complete search history.

(56) References Cited

U.S. PATENT DOCUMENTS

2015/0150406 A1* 6/2015 Miller .................... A47J 31/10
99/298

* cited by examiner

*Primary Examiner* — Phuong T Nguyen
(74) *Attorney, Agent, or Firm* — Alphapatent Associates, Ltd.; Daniel J. Swirsky

(57) ABSTRACT

A cold water extraction system and method for preparing a beverage includes a cold water extraction chamber for brewing a beverage; an insulated beverage storage chamber for storing the beverage brewed in the cold water extraction chamber; a drip band for controlling flow of liquid between the cold water extraction chamber and the beverage storage chamber and a sealing cap configured to seal the beverage storage chamber.

15 Claims, 11 Drawing Sheets

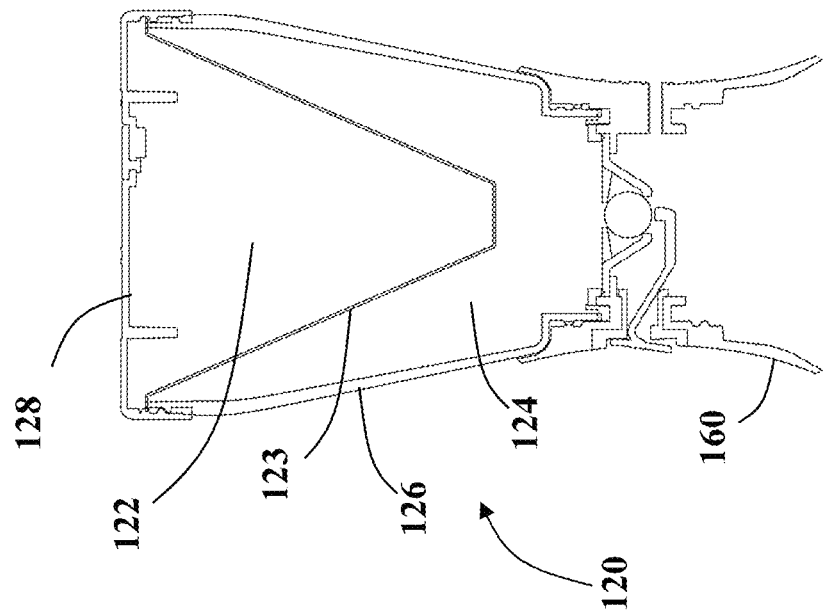
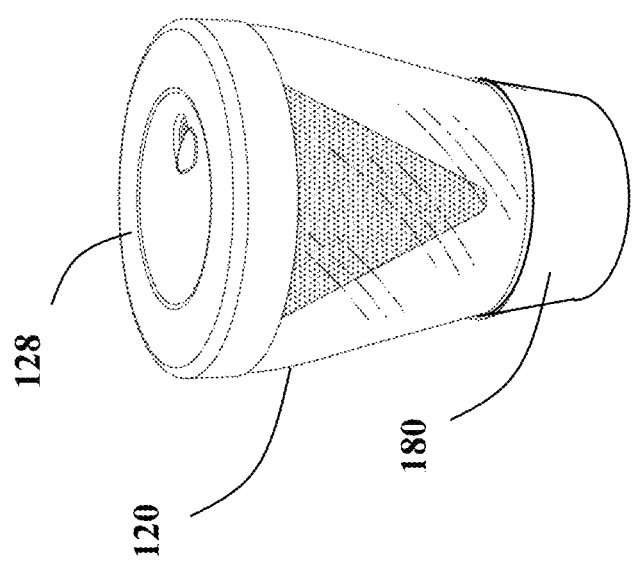
Fig. 2B
Fig. 2A

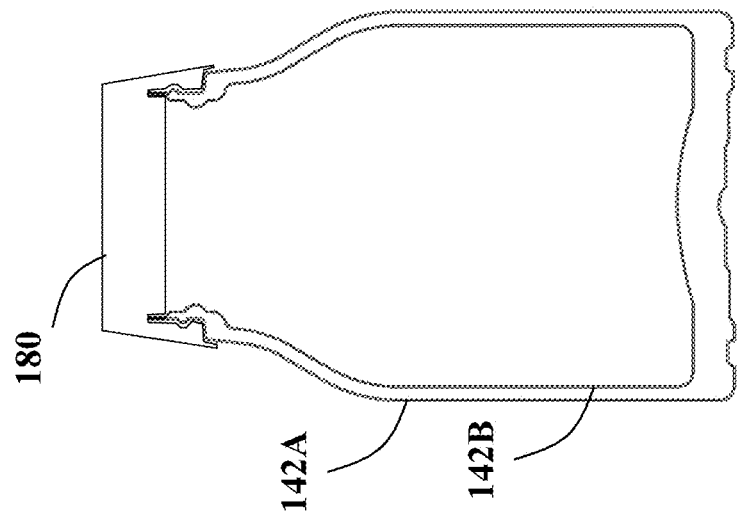
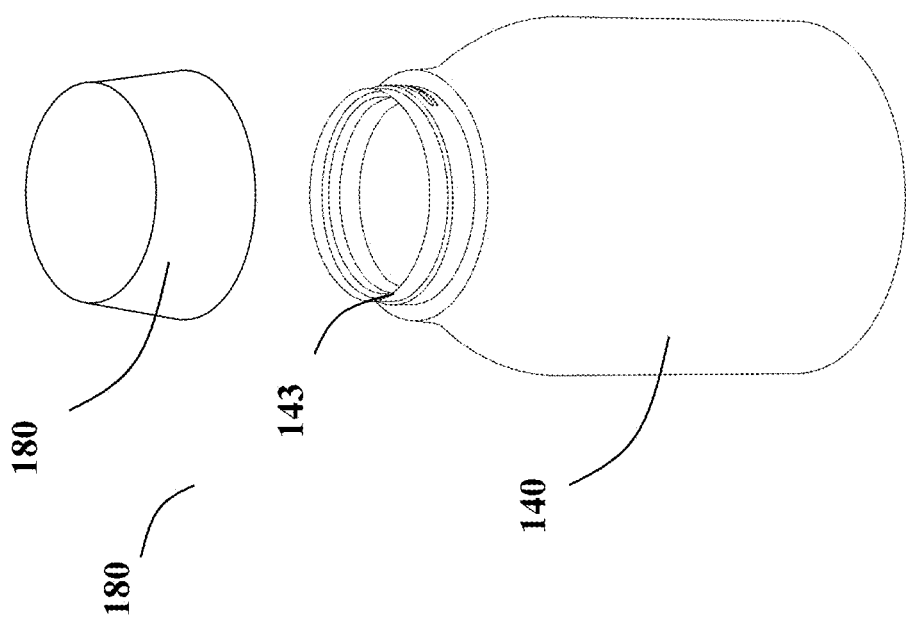
Fig. 3B
Fig. 3A

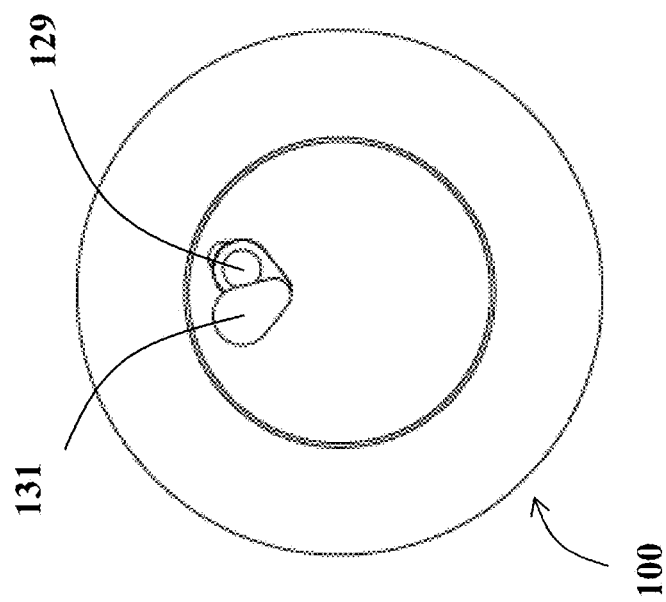
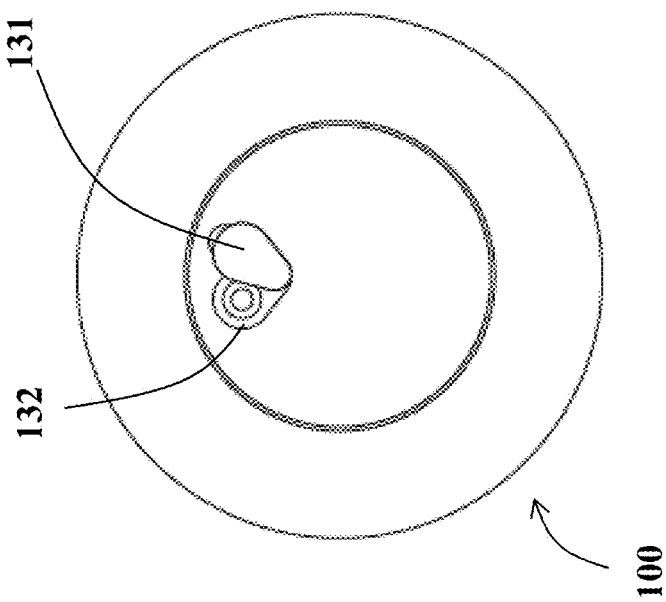
Fig. 6A
Fig. 6B

SYSTEM FOR PREPARING AND STORING A COLD BEVERAGE

CROSS-REFERENCE TO RELATED APPLICATIONS

This application claims the benefit of U.S. Provisional Application No. 62/470,963, filed Mar. 14, 2017, U.S. Provisional Application No. 62/533,162, filed Jul. 17, 2017, U.S. Provisional Application No. 62/594,706, filed Dec. 5, 2017, and U.S. Provisional Application No. 62/611,032, filed Dec. 28, 2017, the disclosures of which are incorporated herein by reference in their entirety.

FIELD

The embodiments disclosed herein relate to systems and methods for preparing and storing a beverage. In particular the embodiments relate to systems and methods for preparing beverages by cold water extraction and storing them for later consumption.

BACKGROUND

The preparation of hot drinks, such as coffee and the like, has long been associated with the brewing of grounds in hot water. Recently it has been found that by steeping grounds in water at cooler temperatures for extended periods, it is possible to prepare a beverage having distinctive characteristics associated with containing fewer chemicals having low solubility at low temperatures.

Producing beverages by cold water extraction, for example at room temperature for say twelve to twenty-four hours, can naturally filter out high temperature soluble chemicals such as fatty acids, caffeine and oils. Thus the resulting coffee has a distinctive chemical profile which is often considered more flavorful and more healthy than the same beverages produced by traditional hot water brewing.

Although beverages produced by cold water extraction may be popular, traditional coffee brewing systems such as coffeemakers, coffee filters, presses, percolators, cafetieres, espresso machines and the like which are often used to prepare coffee are inappropriate for use with cold water. For example, filter coffee systems may require that water passes through filters at a rate too fast for cold water extraction to be effective. Other systems, such as cafetieres and espresso machines, require water to be above boiling point in order to function at all.

Known solutions for preparing beverages using cold water extraction techniques, such as slow drip preparation techniques typically require very complicated equipment unsuitable for small scale use or use in a domestic environment. Nor is such equipment portable requiring that the beverage produced be consumed on site.

Thus a system and method is required for the simple and effective preparation of beverages, such as coffee, using cold water extraction as well as their storage in portable containers. The present disclosure addresses this need.

SUMMARY

In view of the need for a simple and effective preparation of beverages using cold water extraction, as well as the need for effectively maintaining the freshness of the beverage so prepared, aspects of the current disclosure introduce a system and teach a method for preparing and storing such a beverage.

In a first aspect, a beverage preparation system is disclosed comprising: a cold water extraction chamber for brewing a beverage; a beverage storage chamber for storing the beverage brewed in the cold water extraction chamber; a drip band for controlling flow of liquid between the cold water extraction chamber and the beverage storage chamber; and at least one sealing cap configured to seal the beverage storage chamber when the drip band is detached therefrom.

Where appropriate, the cold-water extraction chamber may comprise a granule compartment for containing granules, a cold-water compartment for containing cold water and a porous mesh dividing the granule compartment and the cold water compartment. Typically, the porous mesh has pores of a size selected such that cold water is able to pass there through to mix with granules within the granule compartment whereas granules contained within the granule compartment are not able to pass into the cold-water compartment.

In particular examples of the system, the beverage storage chamber comprises a double-wall insulated drinking container.

It is further taught that the drip band may be configured to couple with the cold water extraction chamber via a first coupling mechanism, forming a first watertight seal, and to couple with the beverage storage chamber via a second coupling mechanism, forming a second watertight seal. The drip band may still further comprise a manual actuator operable to control a sealable throughlet thereby allowing an operator to manually control the flow of liquid between the cold-water extraction chamber and the beverage storage chamber. For example, when the cold-water extraction chamber is above the beverage storage chamber, the actuator may be used to allow liquid in the upper cold-water extraction chamber to drip through the drip band into the lower beverage storage chamber.

Typically, the beverage preparation system is a portable system suitable for use in transit. Accordingly, in particular embodiments, upon connection of the drip band to the cold water extraction chamber and the beverage storage chamber, the whole beverage preparation system may remain watertight such that no liquid leaks therefrom regardless of orientation of the system.

In some examples of the beverage preparation system, the cold water extraction chamber may further comprise a sleeve and a closure. The closure may be configured to form a watertight seal with the sleeve such that the closure and the sleeve form the walls of the cold water extraction chamber. Accordingly, the cold water extraction chamber may further comprise a sealing ring configured to form a seal between the closure and the porous mesh. Where required, the porous mesh of the cold water extraction chamber comprises a removable insert. Optionally, the cold water extraction chamber may further comprise a sealable air inlet.

Where required, the cold water extraction chamber may be sealable by a cap when the drip band is detached therefrom. Optionally, the at least one sealing cap is further configured to seal the cold water extraction chamber when the drip band is detached therefrom.

In some examples of the beverage preparation system, the cold water extraction chamber comprises a first opening configured to couple with the first coupling mechanism and the beverage storage chamber comprises a second opening configured to couple with the second coupling mechanism and the at least one sealing cap comprises a third coupling mechanism configured to seal either of the first opening or the second opening or both. For example, where appropriate, at least one of the first coupling mechanism and the second coupling mechanism comprises a screw connector.

The beverage storage chamber may further be configured as readily portable such that the beverage stored within may be carried by a user for convenient use later.

As required, the beverage storage chamber may further comprise a grip facilitating being lifted with one hand. Additionally, or alternatively, the beverage storage chamber may have dimensions selected to be easily lifted with one hand. Again, additionally or alternatively, the beverage storage chamber comprises a lipped opening facilitating drinking therefrom. Still further, where appropriate, the beverage storage chamber may comprise a pouring spout facilitating pouring therefrom.

According to some examples, the drip band may comprise a stopper biased to seal the throughlet. Accordingly, the manual actuator may be configured to transmit a force to the stopper urging it apart from the walls of the throughlet such that the throughlet is unsealed and liquid can pass therethrough.

Optionally, the drip band has a central waist diameter that is smaller than the both the base diameter of the cold water extraction chamber and the base diameter of the beverage storage chamber.

In another aspect of the disclosure, a method for preparing a beverage is taught. The method comprises: providing cold water extraction chamber comprising a granule compartment separated from a cold-water compartment via a porous mesh, providing a beverage storage chamber comprising a double-wall insulated drinking container, providing a drip band comprising a manual actuator operable to control a sealable throughlet thereby and providing at least one sealing cap.

The method for preparing the beverage may further include introducing granules into the granule compartment of the cold water extraction chamber and introducing cold water into the cold-water compartment of the cold water extraction chamber.

Furthermore, the method may include coupling the drip band with the cold water extraction chamber via a first coupling mechanism, and coupling the drip band with the beverage storage chamber via a second coupling mechanism.

Where appropriate, the method may further include manually operating the actuator thereby allowing liquid to pass through the drip band from the cold-water compartment to the beverage storage chamber, detaching the drip band from the beverage storage chamber, and sealing the beverage storage chamber with the sealing cap.

Optionally, the step of manually operating the actuator may comprise transmitting a force to a stopper biased to seal the throughlet such that the throughlet is unsealed.

Where appropriate, the method may further include leaving the cold water inside cold water extraction chamber for over twelve hours before manually operating the actuator. Additionally or alternatively, the method may include introducing ice cubes into the beverage storage chamber before sealing the beverage storage chamber.

It is further noted that the method may additionally include drinking the liquid directly from the beverage storage chamber.

In other aspects, a combination portable pour-over coffee maker and insulated drinking container are introduced with an upper portion pour-over coffee maker, which may be made of glass or other suitable material, connected to an insulated drinking container, which may be made of metal or other suitable material and may be double-walled, by means of a connecting band, or drip band, which may be useful for portability for gripping when pouring, and including a spout which may be useful for decanting a stored beverage therefrom. A filtration insert within the upper portion may be useful to place the coffee or other material to be brewed.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings:

FIG. 2A is an isometric projection representing an example of a cold-water extraction chamber of the system for preparing beverages using cold-water extraction;

FIG. 2B is a cross-section representing an example of a cold-water extraction chamber of the system for preparing beverages using cold-water extraction;

FIG. 3A is an isometric projection representing showing an example of a beverage storage chamber of the system for preparing beverages using cold-water extraction;

FIG. 3B is a cross-section representing showing an example of a beverage storage chamber of the system for preparing beverages using cold-water extraction;

FIG. 6A shows a top view of the beverage preparation system including an air inlet in an open configuration;

FIG. 6B shows a top view of the beverage preparation system including an air inlet in a closed configuration;

DETAILED DESCRIPTION

Figure 1:
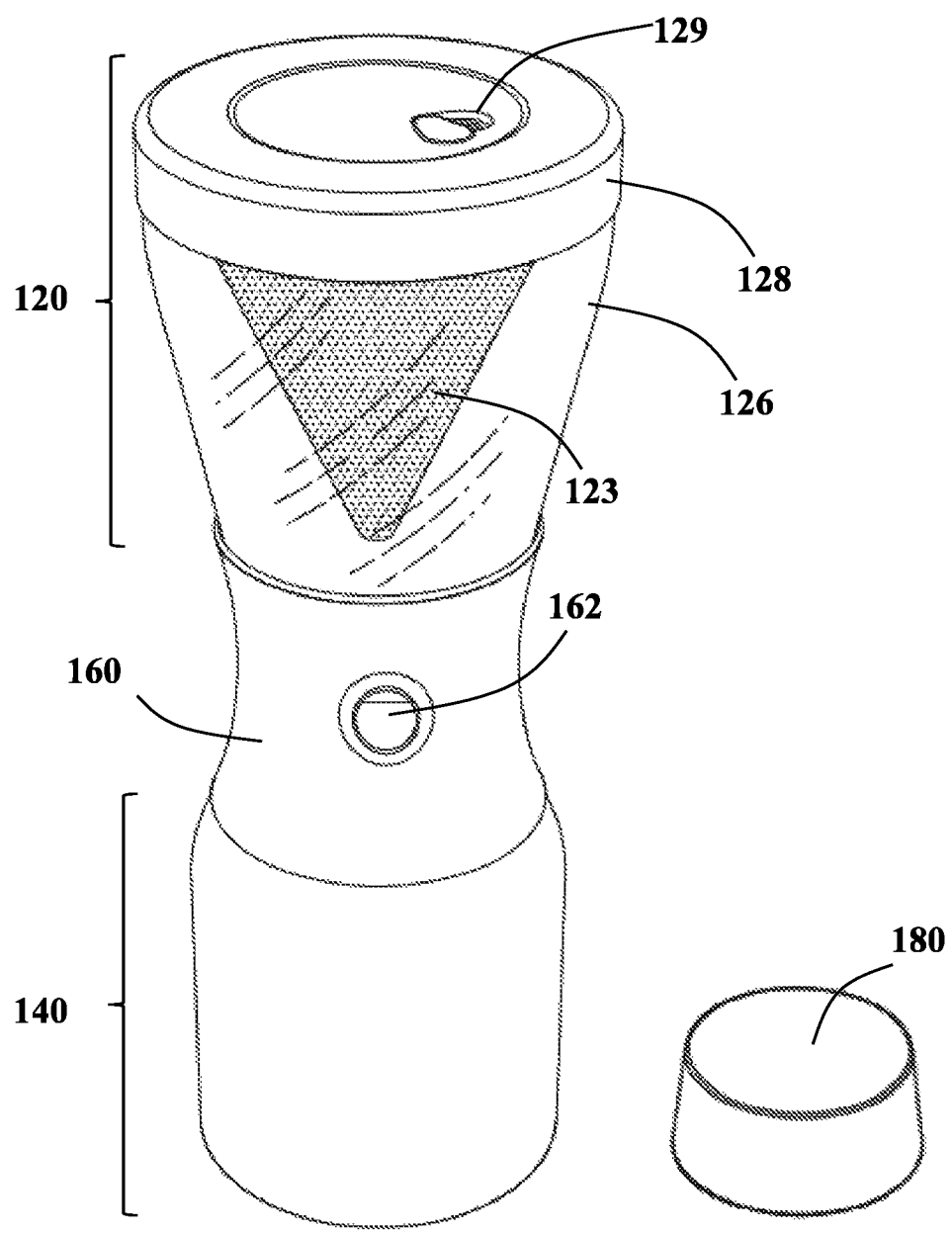
FIG. 1 is an isometric projection representing an example of a system for preparing beverages using cold-water extraction.

Reference is now made to FIG. 1 which shows an isometric projection of an exemplary system 100 for preparing beverages using cold-water extraction. The system may be used to prepare beverages such as coffee simply and effectively for personal use.

The beverage preparation system 100 includes a cold water extraction chamber 120, a beverage storage chamber 140, and a drip band 160. The system 100 also includes a sealing cap 180 which can be used to seal either of the cold water extraction chamber 120 or the beverage storage chamber 140 when they are disconnected from the drip band 160.

The cold-water extraction chamber 120 is configured such that a beverage may be brewed therein using cold water. Typically, a beverage is prepared by adding grounds, leaves or granules to the cold-water extraction chamber 120 and leaving them to seep in cold water for a period of time such as between twelve and twenty-four hours depending upon requirements.

In some configurations, the beverage may be brewed while the cold-water extraction chamber 120 is connected to the drip band 160. Using such a configuration, after the beverage has been left to brew, the brewed beverage may be transferred directly to the beverage storage chamber 140 without the need for reattachment of the drip band 160

Alternatively, or additionally, the cold-water extraction chamber 140 may be detached from the drip band 160. Grounds and cold water may then be added to the cold-water extraction chamber 120 in its detached configuration. The beverage may then brew in the cold-water extraction chamber 120 in its detached configuration. After the beverage has been left to seep for the required duration, the cold-water extraction chamber 120 may be reconnected to the drip band 160 in order to facilitate transfer to the beverage storage chamber 140.

The beverage storage chamber 140 is provided for storing the beverage brewed in the cold water extraction chamber 120 after it has been prepared. The beverage storage chamber 140 may function as both storage container and drinking cup as required. It is particularly noted that in order to store all the beverage prepared, the capacity volume of the beverage storage chamber 140 may be greater than or equal to the capacity volume of cold water held by the cold-water extraction chamber 120. In some embodiments, the capacity of the beverage storage chamber 140 is larger than that of the cold-water extraction chamber 120 such that it may contain ice cubes in addition to the beverage prepared in the cold-water extraction chamber 120. Accordingly, the beverage storage chamber 140 may be insulated such that a chilled beverage may be carried with the user to be enjoyed over an extended period.

In still other examples smaller beverage storage chambers may be provided having alternative shapes and sizes to suit various needs and other brewing methods. For example the beverage storage chamber may be configured such that a single brew prepared in the cold-water extraction chamber 120 may be decanted into a number of individual beverage storage chambers for later use. Additionally or alternatively, a beverage storage chamber may be provided configured to contain a beverage prepared using a hot water brewing technique such as a coffee prepared using a pourover brewing technique such as described herein below.

The drip band 160 is provided for controlling flow of liquid between the cold water extraction chamber 120 and the beverage storage chamber 140 during decanting. A manual actuator 162 may be provided to control a valve 169 (FIG. 5) to allow liquid from the upper chamber, typically the cold-water extraction chamber 120, to drip through to the lower chamber, typically the beverage storage chamber 140 as and when required.

It is particularly noted that in contradistinction from prior art systems, the beverage preparation system 100 of the current disclosure is configured for use as a portable system for use in transit. Accordingly, the drip band 160 is configured to form watertight seals with said cold water extraction chamber 120 and the beverage storage chamber 140, such that when connected, the whole beverage preparation system 100 remains watertight regardless of orientation of the system.

Reference is now made to the isometric projection of FIG. 2A representing the cold-water extraction chamber 120 disconnected from the drip band 160 of the system. Where required, it is noted that the cold-water extraction chamber 120 may be sealed with the sealing cap 180 and used in a standalone configuration for brewing the beverage. Following brewing the brewed beverage may be decanted either via the drip band into the beverage storage chamber 140 or directly into the beverage storage chamber 140 or any other receptacle such as a glass, mug, bottle, jug or the like.

With reference to the cross section of FIG. 2B representing the cold-water extraction chamber 120 connected from the drip band 160. The cold water extraction chamber 120 may include a granule compartment 122, a cold-water compartment 124, and a porous mesh 123.

The granule compartment 122 is provided for containing grounds, granules, leaves or the like from which the beverage concentrate is too be extracted using cold-water extraction. It is noted that access to the granule compartment 122 may be provided via a dedicated opening through which the granules may be introduced. Alternatively, the granules may be introduced via the cold water compartment 124.

The cold-water compartment 124 is provided to contain the cold water used to extract low temperature solutes from the solid granules contained within the granule compartment. Accordingly, the cold water compartment 124 is maintained in liquid communication with the granule compartment 122 so that the water comes into contact with the surfaces of the granules therewithin.

The porous mesh 123 is provided to divide the granule compartment 122 from the cold-water compartment 124. An important function of the porous mesh 123 is to serve as a barrier keeping the granules in the granule compartment 122 and preventing their entry into the cold water compartment 124. At the same time the porous mesh 123 must allow free movement of water from the cold water compartment 124 into the granule compartment 122. Accordingly, the porous mesh typically has pores of a size selected such that cold water is able to pass therethrough to mix with granules within the granule compartment 122 whereas granules contained within the granule compartment are not able to pass into the cold-water compartment 124.

Where required, the cold water extraction chamber 120 may further comprise a sleeve 126 and a closure 128. The closure 128 may form either the lid or the base of the chamber depending upon its orientation and forms a watertight seal with the sleeve 126 such that the closure 128 and the sleeve 126 combine to form outer walls of the cold water extraction chamber 120. In some embodiments the sleeve 126 is transparent allowing light to pass into the cold-water extraction chamber during brewing and also to allow the users to see the beverage being prepared.

In order to prevent leakage from the cold-water extraction chamber 120, particularly when oriented such that the closure 128 serves as its base, a sealing ring (not shown) may be provided to form a watertight seal between the closure 128 and the sleeve 126.

In some embodiments, the porous mesh 123 comprises a removable insert which can be introduced into the cold water extraction chamber 120 via the opening formed when the closure 128 is removed.

It is noted that typically, the closure 128 and sleeve 126 form walls of the cold water extraction chamber 120 leaving an open aperture to the chamber through which water may be introduced when used in a standalone configuration orientated such that the closure 128 serves as a base. The aperture may be sealable by either the drip band 160 or a cap 180. It is noted that same sealing cap 180 may be configured to seal either the cold water extraction chamber 120 or the beverage storage chamber 140. Alternatively, where required, each chamber may have its own separate sealing cap.

Reference is now made to the isometric projection of FIG. 3A and the cross section of FIG. 3B representing the beverage storage chamber 140 disconnected from the drip band 160 of the system. Where required, it is noted that the beverage storage chamber 140 may be sealed with the sealing cap 180 for storing the beverage and keeping it fresh.

It is noted that, where required the beverage storage chamber 140 may have a double-wall 142a, 142b for insulating its contents. It is noted that this has surprisingly been found to solve a long standing problem associated with the preparation of beverages by cold water extraction, namely how to maintain their freshness over time outside a refrigerator. Because fatty acids are typically less soluble at low temperatures beverages, such as coffee, produced by cold water extraction are particularly noted for their reduced acidity. However, the freshness and flavor of beverages produced by cold water extraction has been discovered to decrease over time and the rate of deterioration has been found to be temperature dependent.

It is further noted that it is most advantageous for the beverage storage chamber 140 to be easily portable. Accordingly, the dimensions of the beverage storage chamber 140 may be selected such that it is easily lifted with one hand. Where appropriate, the beverage storage chamber 140 may further comprise a grip facilitating lifting with one hand.

For ease of use, the beverage storage chamber 140 may have a lipped rim 143 to facilitate drinking therefrom or a pouring spout to facilitate pouring therefrom as suit requirements.

The problem of deterioration of a beverage, such as coffee, produced by cold water extraction beverage becomes more acute when milk is added. Over time lactic acid bacteria such as lactobacilli, within the milk produce acids resulting in the taste of the beverage becoming more acidic and sour over time. The resulting increase in sourness over time is particularly noticeable in beverages produced by cold-water extraction which have low natural acidity. It has been found that bacteria such as lactobacilli are significantly less active at lower temperatures.

Furthermore, microbial enzymes within the milk, such as *Bacillus cereus* may accelerate production of proteinaceous fat particles at higher temperatures. This results in clumping of cream often seen in milk products during the summer. It has been found that the rate of production of proteinaceous fat particles decreases at lower temperatures.

It has been surprisingly found that by adding ice cubes to the insulated beverage storage chamber 140, cold brewed beverages stored therein may be maintained at a low temperature for prolonged periods preventing or slowing time related deterioration of the beverage.

Figure 3C:
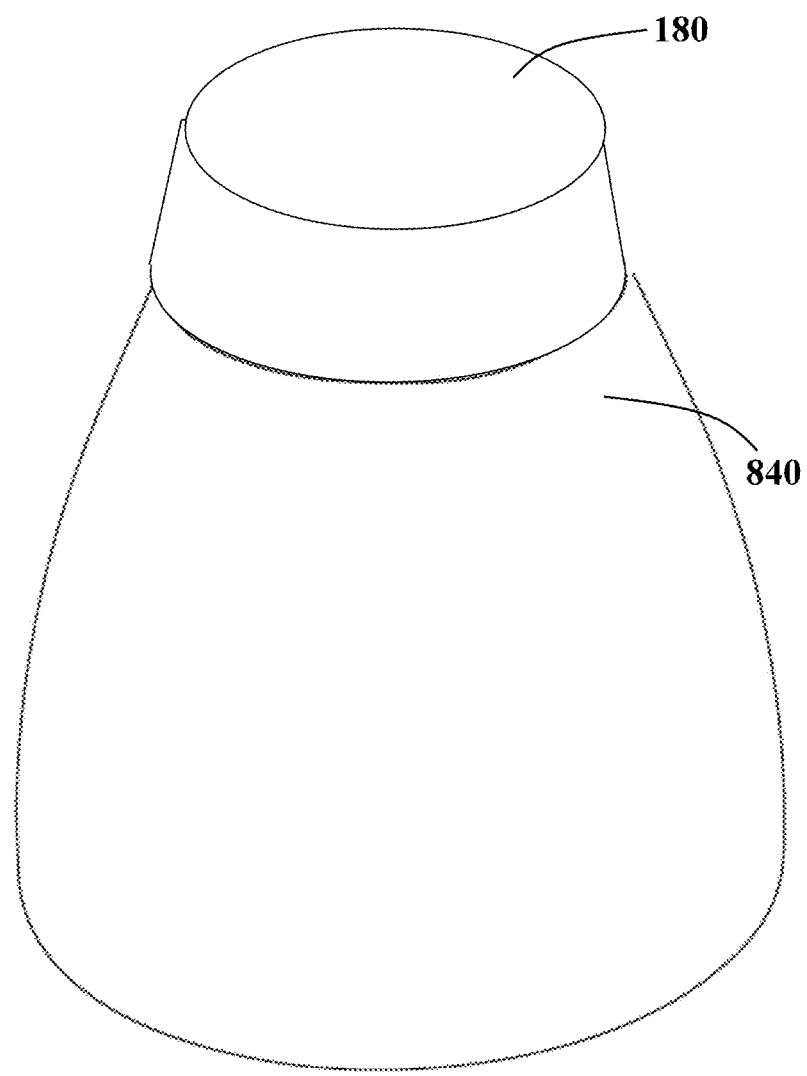
FIG. 3C is an isometric projection representing showing another example of a beverage storage chamber of the system for preparing beverages using various extraction techniques.

With reference now to FIG. 3C, it is further noted that a beverage storage unit 840 may be provided having a different wall curvature and capacity. Such a beverage storage unit may be sealable using sealing cap 180 to keep the beverage fresh. It is particularly noted that the capacity of the alternative beverage storage unit 840 may be about 500 milliliters or so, as required for containing coffee produced by a pourover brewing technique.

Figure 4:
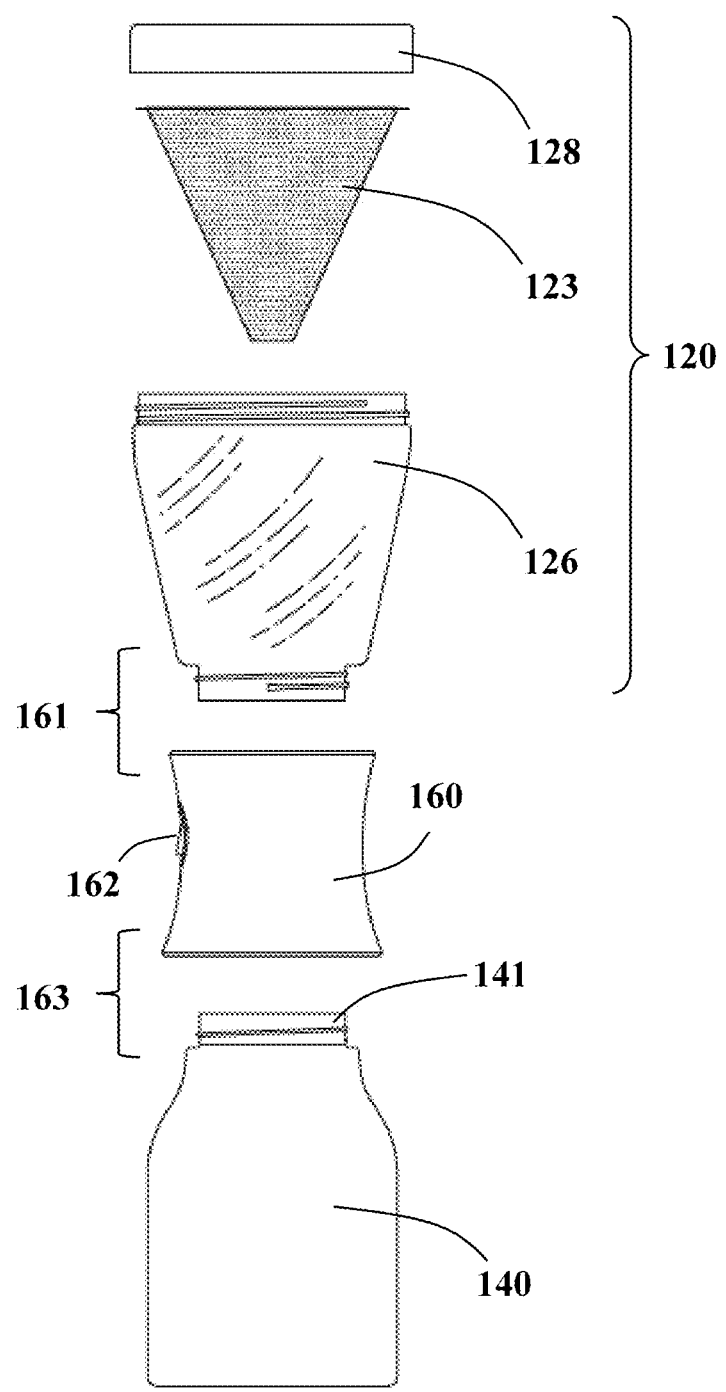
FIG. 4 is an exploded view representing how the various elements of the system may be connected to form a beverage preparation unit.

Referring now to FIG. 4 an exploded view is presented illustrating how the various elements of the system 100 may be connected to form a single beverage preparation unit.

The drip band 160 is configured to couple with the cold water extraction chamber 120 via a first coupling mechanism 161 and to couple with the beverage storage chamber 140 via a second coupling mechanism 163. The first coupling mechanism forms a first watertight seal and the second coupling mechanism forms a second watertight seal such that liquid passing from the cold-water extraction chamber 120 into the beverage storage chamber 140 does not leak through the connection. It is noted that the coupling mechanisms may be screw threads.

Figure 5:
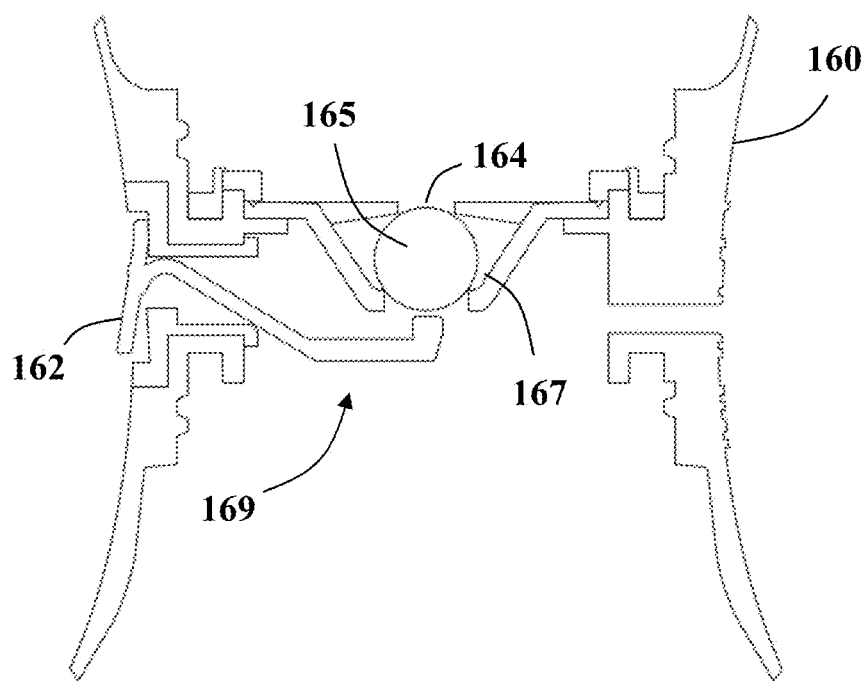
FIG. 5 is a cross section representing the drip band of the system for controlling liquid flow between the cold-water extraction chamber and the beverage storage chamber.

Referring now to the cross section of FIG. 5 representing the drip band 160, it is a particular feature of the system that the drip band 160 may include a manual actuator 162 operable to control a sealable throughlet 164 thereby allowing an operator to manually control the flow of liquid between the cold water extraction chamber 120 and the beverage storage chamber 140. For example when the cold water extraction chamber 120 is above the beverage storage chamber 140, the actuator 162 may be used to allow liquid in the upper cold water extraction chamber to drip through the drip band 160 into the lower beverage storage chamber 140.

According to some examples, the drip band may include a control valve 169 including a stopper 165 biased to seal the throughlet 164. Accordingly, the manual actuator 162 may be configured to transmit a force to the stopper 165 urging it apart from the walls 167 of the throughlet 164 such that the throughlet 164 is unsealed and liquid can pass therethrough. Optionally, the drip band 160 further includes an air inlet 169 via which air may ingress or egress from the beverage storage chamber 140.

Optionally again, the drip band has a central waist diameter that is smaller than the both the base diameter of the cold water extraction chamber and the base diameter of the beverage storage chamber.

With reference to FIGS. 6A and 6B, representing top views of the beverage preparation system 100, some examples of the system may further include a sealable air inlet 129.

The sealable air inlet 129 may be configured to be either in a closed configuration such as represented in FIG. 6A or in a open configuration such as represented in FIG. 6B. In one example a stopper 131 may be provided which can be moved to seal the air inlet 129 to prevent leakage therefrom when in the closed configuration or alternatively docked into a housing 132 when in the open configuration.

It is particularly noted that when a sealable air inlet 129 is provided, by adjusting the air inlet 129 into the open configuration before manually operating the actuator 162 of the drip band 160 the liquid from the cold-water extraction chamber 120 may flow smoothly through the drip band 160.

Figure 7:
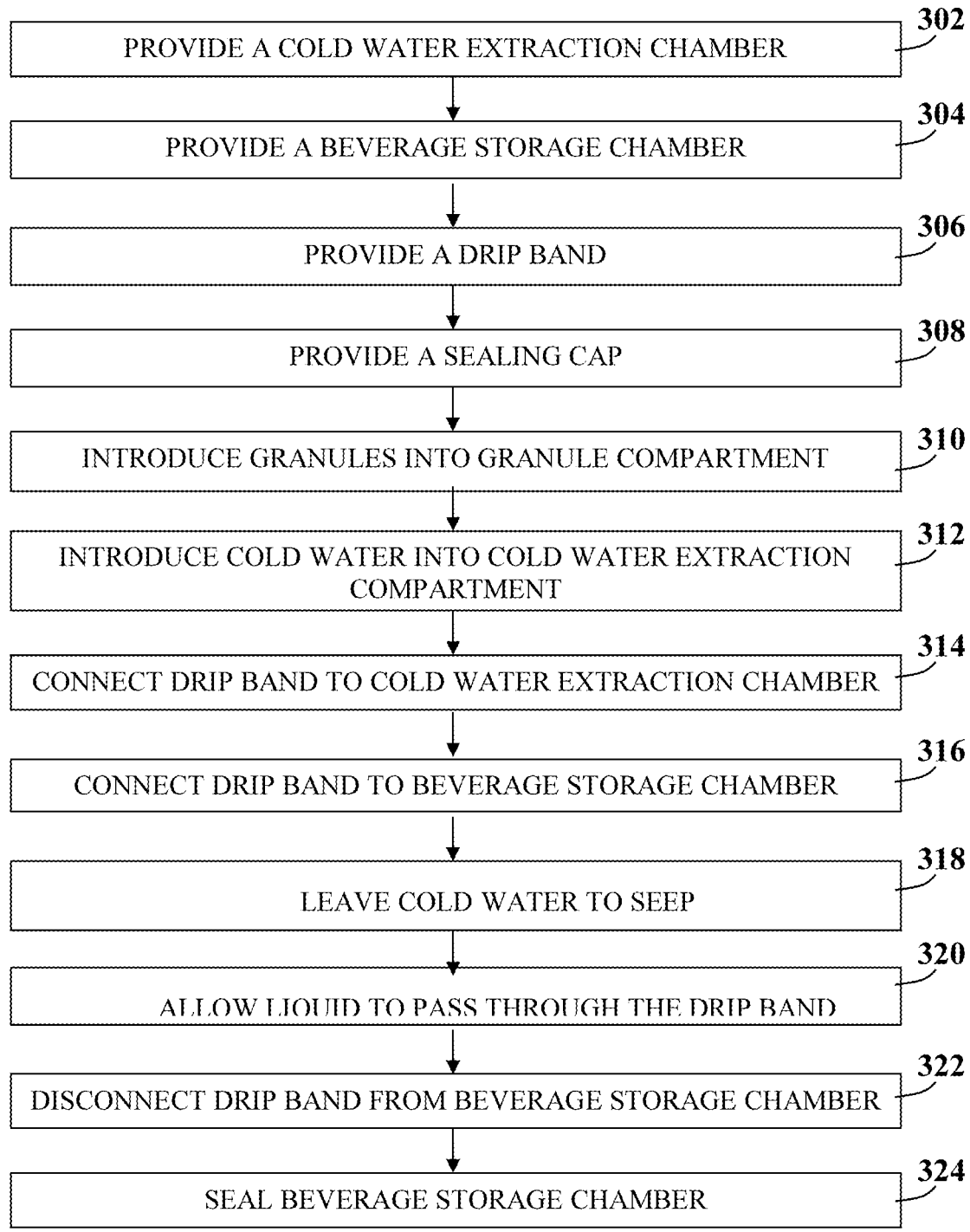
FIG. 7 is a flowchart illustrating a possible method for using the system to prepare a beverage using cold-water extraction.

Reference is now made to the flowchart of FIG. 7 which shows selective actions of a possible method for using the cold water extraction beverage preparation system 100 to prepare a beverage using cold-water extraction. The method includes providing a cold water extraction chamber 302, providing a beverage storage chamber 304, providing a drip band 306, providing a sealing cap 308, connecting the drip band to the cold water extraction chamber 314 and connecting the drip band to the beverage storage chamber 316.

The method may further include preparing the beverage by introducing granules into a granule compartment of the cold water extraction chamber 310, introducing cold water into the cold-water compartment of the cold water extraction chamber 312 and leaving the cold water and granules inside cold water extraction chamber to seep 318. Typically the liquid may be left for a seeping time of between twelve and eighteen hours. However seeping times within the range of one hour to twenty four hours may be preferred as required.

The method may further include decanting the liquid by allowing liquid to pass through the drip band from the cold-water compartment to the beverage storage chamber 320, for example by manually operating an actuator of the drip band.

The decanted liquid may be stored by detaching the drip band from the beverage storage chamber 322, and sealing the beverage storage chamber with the sealing cap 324.

Various preparation methods may be used including, for example, by adding milk to the decanted beverage. In certain examples the method includes introducing ice cubes into the beverage storage chamber before sealing the beverage storage chamber. Accordingly, the beverage may be stored for extended periods.

It is further noted that the beverage storage chamber may be carried with the user and the user may drink the beverage directly from the beverage storage chamber when required.

Figure 8A:
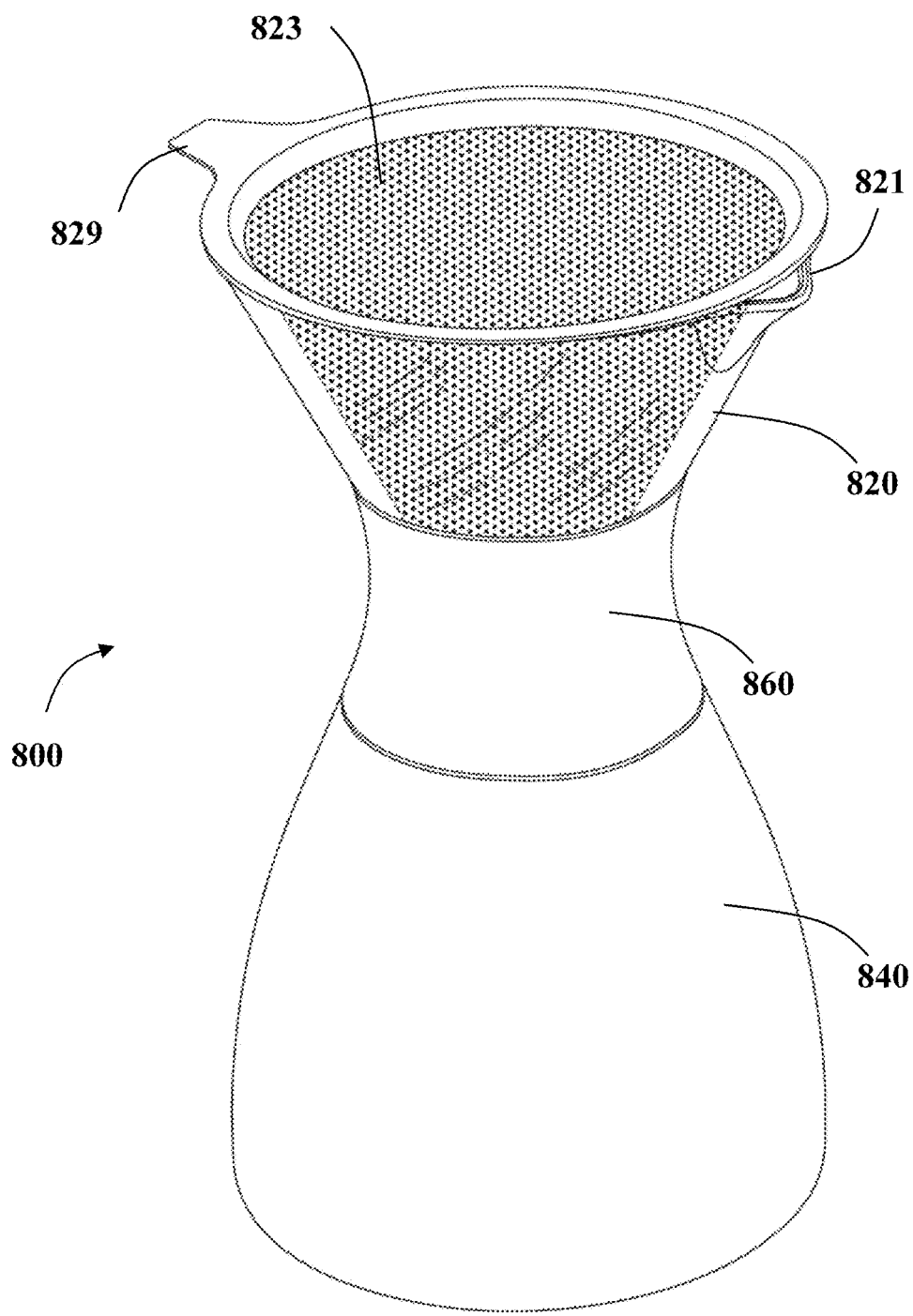
FIGS. 8A and 8B show an example of a pourover extraction beverage preparation system.

Reference is now made to FIG. 8A representing another beverage preparation system 800 which includes a pourover filtration unit 820, a beverage storage chamber 840, and a drip band 860.

The pourover filtration unit 820 may include a removable filter insert 823 forming container having porous mesh walls and which is open at the top for receiving solid concentrate such as coffee granules.

The filter insert may include a tab 829 which may be used to remove the filter insert from the pourover filtration unit 820 when not required.

The pourover filtration unit 820 may further include a pouring lip 821 which may facilitate decanting of an extracted the beverage from the beverage storage container 840.

Figure 8B:
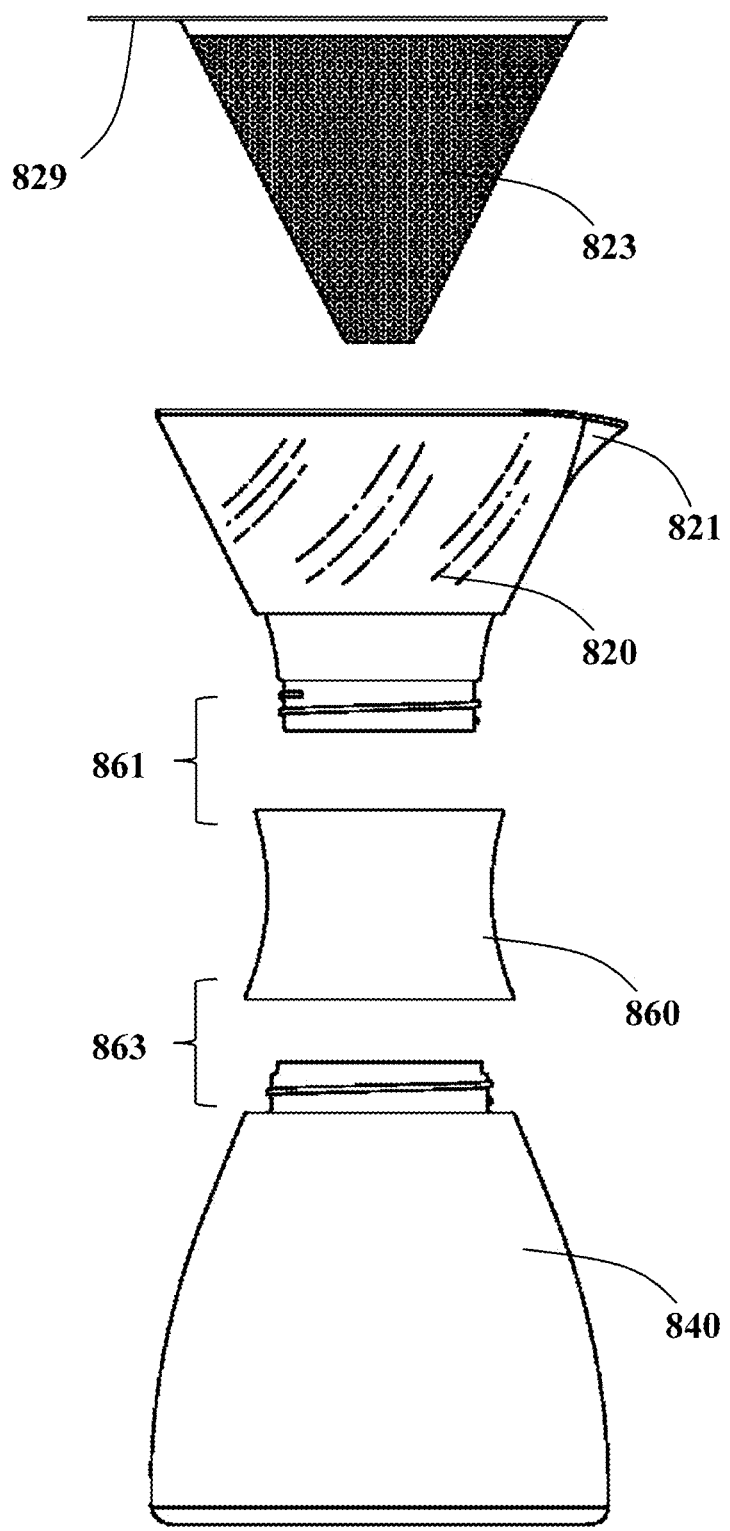

Referring now to the exploded view of FIG. 8B, the various elements of the pourover extraction system 800 may be connected to form a single beverage preparation unit.

The drip band 860 is configured to couple with the pourover filtration unit 820 via a first coupling mechanism 861 and to couple with the beverage storage chamber 840 via a second coupling mechanism 863. The first coupling mechanism forms a first watertight seal and the second coupling mechanism forms a second watertight seal such that liquid passing from the pourover filtration unit 820 into the beverage storage chamber 840 does not leak through the connection. It is noted that the coupling mechanisms may be screw threads.

The beverage storage unit 840 may include double-walls such as described herein for insulating its contents. Thus when a hot pourover extraction technique is used the beverage storage unit 840 may be detached from the drip band 860 and sealed using an insulated sealing cap 180 such that the hot stored beverage retains its heat over an extended period until needed.

It is further noted that, unlike the drip band 160 of the cold-water extraction beverage preparation system 100, the drip band 860 of the pourover extraction system 800 may provide an unobstructed throughlet via which extracted beverage may pass into the beverage storage chamber 840 and through which stored beverage may pass when being decanted.

Nevertheless, it is a feature of the current embodiments that the coupling mechanisms 161, 163 of the drip band 160 of the cold-water extraction beverage preparation system 100, and the coupling mechanisms 861, 863 of the drip band 860 of the pourover extraction system 800 may be compatible such that the connecting parts may be interchangeable. Thus the beverage storage unit 140 of the cold-water extraction beverage preparation system 100 may be connected to the drip band 860 of the pourover extraction system 800 as required. Similarly a common sealing cap 180 may be interchangeably used to seal either the beverage storage unit 140 of the cold-water extraction beverage preparation system 100 or the beverage storage unit 840 of the pourover extraction system 800 as required.

Figure 9:
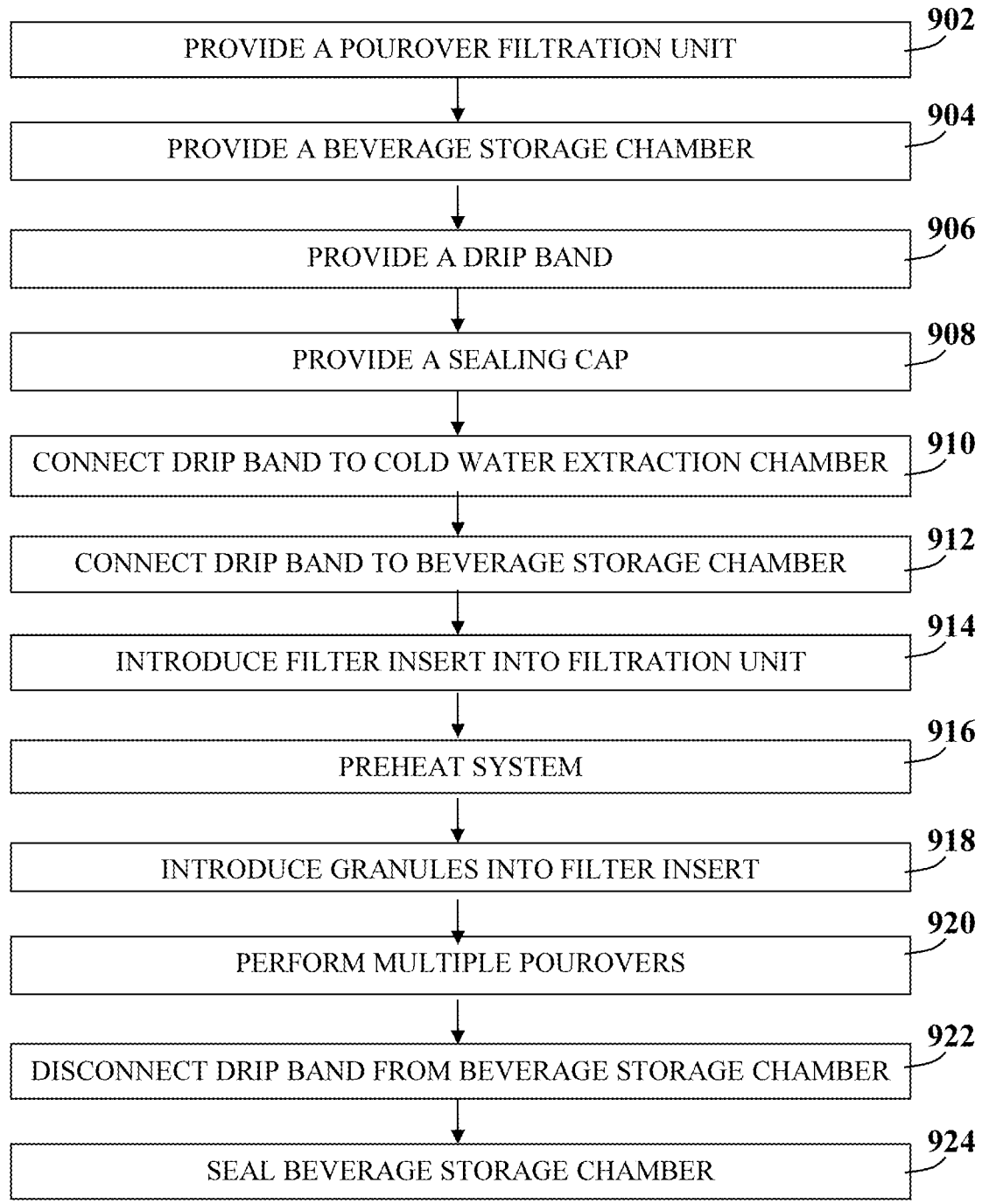
FIG. 9 is a flowchart illustrating a possible method for using the pourover extraction beverage preparation system to prepare a beverage using pourover extraction techniques.

Reference is now made to the flowchart of FIG. 9 which shows selective actions of a possible method for using the pourover extraction beverage preparation system 800 to prepare a beverage using pourover extraction. The method includes providing a pourover filtration unit 902, providing a beverage storage chamber 904, providing a drip band 906, providing a sealing cap 908, connecting the drip band to the pourover filtration unit 910 and connecting the drip band to the beverage storage chamber 912.

The method may further include introducing a filter insert into the filtration unit 914 and preheating the system 916, for example by pouring hot water through the filtration unit into the beverage storage unit and then discarding the water.

The method may continue by introducing granules into the filter insert 918 and performing multiple pourovers 920.

Various pourover methods will be familiar to those skilled in the art for example a 30 gram measure of coffee granules may be introduced into the filtration unit and a first pour of 60 grams of water may be poured over the coffee granules in an inward spiral motion over a time of about 15 seconds, before leaving the coffee to drip for about 30 seconds. A second pour of 90 grams of water may then be poured over the coffee granules in an outward spiral motion before leaving the coffee to drip for a further 45 to 65 seconds. A third pour of about 100 grams of water may be poured over the coffee granules in an outward spiral motion over another 15-20 seconds. Once the third pour as dripped through, still a fourth pour of a further 100 grams of water may be poured over the coffee granules in an outward spiral motion over another 20 seconds or so. The pourover extraction beverage preparation system may be used with alternative pourover methods as required.

The collected liquid may be stored by detaching the drip band from the beverage storage chamber 922, and sealing the beverage storage chamber with the sealing cap 924. It is further noted that the beverage storage chamber may be carried with the user and the user may drink the beverage directly from the beverage storage chamber when required.

The scope of the disclosed subject matter is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

What is claimed is:

1. A beverage preparation system comprising:
   a cold water extraction chamber for brewing a beverage;
   a beverage storage chamber for storing the beverage brewed in the cold water extraction chamber;
   a drip band for controlling flow of liquid between the cold water extraction chamber and the beverage storage chamber; and
   at least one sealing cap configured to seal the beverage storage chamber when the drip band is detached therefrom;
   wherein:
   the cold water extraction chamber comprises a granule compartment for containing granules, a cold-water compartment for containing cold water and a porous mesh dividing the granule compartment and the cold-water compartment, the porous mesh has pores of a size selected such that cold water is able to pass therethrough to mix with granules within the granule compartment whereas granules contained within the granule compartment are not able to pass into the cold-water compartment;
   the beverage storage chamber comprises a double-wall insulated drinking container;
   the drip band is configured to couple with the cold water extraction chamber via a first coupling mechanism forming a first watertight seal and to couple with the beverage storage chamber via a second coupling mechanism forming a second watertight seal; and
   the drip band further comprises a manual actuator operable to control a sealable throughlet thereby allowing an operator to manually control the flow of liquid between the cold water extraction chamber and the beverage storage chamber.

2. The beverage preparation system of claim 1 wherein the cold water extraction chamber further comprises a sleeve and a closure, the closure configured to form a watertight seal with the sleeve such that the closure and the sleeve form the walls of the cold water extraction chamber.

3. The beverage preparation system of claim 2 wherein the cold water extraction chamber further comprises a sealing ring configured to form a seal between the closure and the porous mesh.

4. The beverage preparation system of claim 1 wherein the porous mesh of the cold water extraction chamber comprises a removable insert.

5. The beverage preparation system of claim 1 wherein the cold water extraction chamber further comprises a sealable air inlet.

6. The beverage preparation system of claim 1 wherein the at least one sealing cap is further configured to seal the cold water extraction chamber when the drip band is detached therefrom.

7. The beverage preparation system of claim 1 wherein the cold water extraction chamber comprises a first opening configured to couple with the first coupling mechanism and the beverage storage chamber comprises a second opening configured to couple with the second coupling mechanism and the at least one sealing cap comprises a third coupling mechanism configured to seal either of the first opening or the second opening or both.

8. The beverage preparation system of claim 1 wherein at least one of the first coupling mechanism and the second coupling mechanism comprises a screw connector.

9. The beverage preparation system of claim 1 wherein the beverage storage chamber further comprises a grip facilitating being lifted with one hand.

10. The beverage preparation system of claim 1 wherein the beverage storage chamber has dimensions selected to be easily lifted with one hand.

11. The beverage preparation system of claim 1 wherein the beverage storage chamber comprises a lipped opening facilitating drinking therefrom.

12. The beverage preparation system of claim 1 wherein the beverage storage chamber comprises a pouring spout facilitating pouring therefrom.

13. The beverage preparation system of claim 1 wherein the drip band comprises a stopper biased to seal the throughlet and wherein the manual actuator is configured to transmit a force to the stopper such that the throughlet is unsealed and liquid can pass therethrough.

14. The beverage preparation system of claim 1 wherein the drip band has a central waist diameter that is smaller than the both the base diameter of the cold water extraction chamber and the base diameter of the beverage storage chamber.

15. The beverage preparation system of claim 1 wherein upon connection of said drip band to said cold water extraction chamber and said beverage storage chamber, the beverage preparation system remains watertight such that no liquid leaks therefrom regardless of orientation of the system.

* * * * *